United States Patent Office 2,882,282
Patented Apr. 14, 1959

2,882,282

METHOD OF PRODUCING 3-KETO-$\Delta^{4,6}$-STEROID COMPOUNDS FROM 3-KETO A-RING SATURATED 6-DIHYDRO STEROID COMPOUNDS

Eugene J. Agnello and Gerald D. Laubach, Jackson Heights, N.Y., assignors to Chas. Pfizer & Co., Inc., New York, N.Y., a corporation of Delaware No Drawing. Application July 17, 1957
Serial No. 672,363

6 Claims. (Cl. 260—397.3)

This invention is concerned with a method of producing 3-keto-$\Delta^{4,6}$-steroid compounds from 3-keto A-ring saturated 6-dihydro steroid compounds.

Various methods have been utilized in the past for the introduction of double bonds at the 1,2- 4,5- and 6,7-positions of steroid compounds. The most important of these prior methods is the treatment of 3-keto compounds with bromine to introduce bromine at the 2 and/or 4-positions or the treatment of these same compounds with N-bromosuccinimide to introduce bromine at the 6-position. These reactions are followed by dehydrobromination to produce the requisite double bonds. The present process has certain definite advantages particularly in that only one step is involved, that is, double bonds can be introduced directly to the molecule without the necessity of bromination and dehydrobromination.

In the present novel process an A-ring saturated 3-keto 6-dihydro steroid is treated with a quinone having an oxidation-reduction potential of less than —0.5 to accomplish the introduction of double bonds at the 4 and 6 positions or at the 1,4 and 6-positions. Although the reaction most probably proceeds with the intermediate production of a $\Delta^4$-compound, the kinetics of the reaction are such that it is not practical to isolate a $\Delta^4$-compound but rather the reaction is permitted to proceed to the production of at least a $\Delta^{4,6}$-compound. If desired, the reaction can be extended to produce $\Delta^{1,4,6}$-compounds except that if the steroid starting material has a halogen atom in the 9$\alpha$-position, the reaction can be utilized only for the production of $\Delta^{4,6}$-compounds.

For optimum production of $\Delta^{4,6}$-compounds up to 2.2 molar proportions of the quinone may be used but it is preferred to use two molar proportions, that is, one equivalent of the quinone for the particular reaction involved since if less than this amount is used, the reaction produces a mixture of unreacted starting material and $\Delta^{4,6}$-compounds. If more than this amount is used there is danger that excessive amounts of $\Delta^{1,4,6}$-compounds will be produced. If it is desired to carry out the reaction for the exclusive production of $\Delta^{1,4,6}$-compounds, it is preferred to use at least three molar proportions, that is, one equivalent for the reaction involved and as many as six or even more molar proportions of the quinone will insure completeness of the reaction.

It is a particular advantage of the process of this invention that steroid starting compounds with either the normal or the allo configuration can be used.

Essentially any A-ring saturated 3-keto 6-dihydro steroid, preferably containing from eighteen to twenty-one carbon atoms in the steroid nucleus may be used in the operation of the present process. A variety of substituents may be present on the steroid nucleus without affecting the reaction in any way. This includes substituents at, for instance, the 9,11,14,15,16 and 17-positions except as noted above with reference to 9$\alpha$-halo substituents. A keto group may occur at the 11, 17 and/or 20-positions. Hydroxy groups may be present at the 9,11,14,15,17 and/or 21-positions. Halogen atoms may be present at the 9,15,16 and/or 21-positions. Alkyl groups, and ethinyl group or a vinyl group may be at the 17-position etc. Double bonds may be at positions other than in the A-ring without interfering with the process. This includes double bonds at the 8,14,16 or 9(11)-positions or certain combinations of these. Among the compounds which can be prepared using the process of this invention are $\Delta^{4,6}$-pregnadiene-3,11,20-trione-17$\alpha$,21-diol; $\Delta^{4,6}$-pregnadiene-3,20-dione-11$\beta$,17$\alpha$,21-triol; $\Delta^{1,4,6}$-pregnatriene-3,11,20-trione-17$\alpha$,21-diol; $\Delta^{1,4,6}$-pregnatriene - 3,20-dione-11$\beta$,17$\alpha$,21-triol; $\Delta^{4,6}$-pregnadiene-3,20-dione-21-ol; $\Delta^{4,6}$-pregnadiene-3,20-dione-11$\beta$,21-diol; $\Delta^{1,4,6}$ - pregnatriene-3,11,20-trione-21-ol; $\Delta^{4,6}$-pregnadiene-3,11,20-trione-14$\alpha$,17$\alpha$,21-triol; $\Delta^{4,6}$-pregnadiene-3,20-dione-11$\beta$,14$\alpha$,17$\alpha$,21-tetrol; $\Delta^{1,4,6}$-pregnatriene-3,11, 20 - trione-15$\beta$-bromo-14$\alpha$,17$\alpha$,21-triol; $\Delta^{4,6}$-pregnadiene-3,20 - dione-11$\beta$,14$\alpha$,15$\beta$,17$\alpha$,21-pentol; $\Delta^{4,6}$-pregnadiene-9$\alpha$ - fluoro - 3,11,20 - trione-17$\alpha$,21-diol; $\Delta^{4,6}$-pregnadiene-9$\alpha$ - bromo-3,20-dione-11$\beta$,17$\alpha$,21-triol; $\Delta^{4,6,14}$-pregnatriene - 3,11,20 - trione - 17$\alpha$,21-diol; $\Delta^{4,6}$-pregnadiene-3,20-dione; $\Delta^{1,4,6}$-pregnatriene-3,11,20-trione; $\Delta^{1,4,6}$-pregnatriene - 3,20-dione-14,15-oxido-11$\beta$,17$\alpha$, 21-triol; $\Delta^{4,6}$-androstadiene-3-one-17$\beta$-ol; $\Delta^{4,6}$-norandrostadiene-11$\beta$,17$\beta$-diol - 17$\alpha$-vinyl-3-one; $\Delta^{1,4,6}$-androstatriene-17$\beta$-ol-17$\alpha$-n-butyl-3,11-dione; $\Delta^{1,4,6}$-androstatriene-3,11,17-trione; $\Delta^{4,6}$-androstadiene - 9$\alpha$ - fluoro-11$\beta$,17$\beta$-diol-17$\alpha$-methyl-3-one and the esters of these compounds having a 21-hydroxyl group or if a derivative of androstene or norandrostene a 17-hydroxyl group. These esters include, for example, the benzoates, acetates, propionates, butyrates, hemisuccinates and other carboxylic acid groups having from one to ten carbon atoms.

Among the products which can be prepared using the process of the instant invention are compounds known to have activity as steroid cortical hormone type compounds, that is, they possess anti-inflammatory action when administered to animals including humans. Some are more active than others. For instance, these substances when administered by the oral, intramuscular or by the intra-articular route, are effective in reducing inflammation due to such conditions as rheumatoid arthritis. They may also be applied topically to reduce inflammation due to various infectious processes. For example, these substances are highly effective in reducing the inflammation due to poison ivy. They may be administered topically in the form of ointments or salves in suitable bases familiar to those in the pharmaceutical manufacturing art. They also may be injected intra-articularly as suspensions in water or in saline solution. Derivatives of androstene are useful in correcting nitrogen imbalance after serious injury or surgery.

In operating this new process, the A-ring saturated steroid compound which is to be used as a starting material, is placed in an organic solvent preferably an alkanol solvent containing up to about nine carbons and having a boiling point of at least 100° C. Although other solvents such as dimethylformamide, dimethylsulfoxide and phenetole can be used, it is preferred to use alcohols since better yields of pure product are more readily obtained. The requisite amount of a quinone, that is, up to about six moles of quinone per mole of steroid starting material is added and the mixture is heated at a temperature between about 100° and about 190° C. Most conveniently the mixture is refluxed at the boiling point of the solvent under atmospheric conditions. The reaction can be conducted under an atmosphere of an inert gas such as nitrogen to reduce side reactions to a minimum although this is not necessary. Refluxing is continued for several hours, that is, from about two to about thirty hours depending upon the particular compound used as starting material and other conditions under which the reaction is run.

The product formed by the dehydrogenation reaction may be isolated from the resulting solvent solution by various methods. It is often convenient to remove the solvent by concentration in vacuo to leave the solid product as a residue. Alternatively, a solvent having a somewhat lower boiling point in which the product is soluble such as chloroform, methylene chloride, carbon tetrachloride, benzene, etc. may be added. The mixture may then be washed with an aqueous solution of a reducing agent such as sodium hydro-sulfite although this is not necessary and then with a dilute alkaline reaction such as sodium hydroxide, and the like to remove the reduction product of the quinone. The solvent solution is then dried for instance over an anhydrous solid salt such as sodium or magnesium sulfate. The solution is then concentrated in vacuo to obtain the desired product.

Quinones which can be used in carrying out the process of this invention are those which under standard conditions have oxidation-reduction potentials of less than −0.5, and preferably those having potentials of −0.65 or less. Oxidation-reduction potentials are readily determined by reference to any scientific tests (see Handbook of Chemistry and Physics, 31st edition, page 1442, Chemical Rubber Company, 1949, and Latimer and Hildebrand, Reference Book of Inorganic Chemistry, rev. ed., pages 474–481, MacMillan Company, 1940). Quinone itself, also known as benzoquinone, chloranil or tetrachloroquinone, toluquinone or methylquinone, 1,2-naphthaquinone, 2,6 - dichlorobenzoquinone, hydroquinone and xyloquinone or dimethylquinone, have been particularly successfully employed in the new process.

Prior art methods that have been used for the introduction of double bonds at the 1,4 and/or 6-positions of the steroid molecule do not have the many advantages of the present process. For instance, the present process occurs in a single reaction step and does not require two steps such as bromination and dehydrobromination which has heretofore been used for the introduction of a double bond in these positions of the steroid molecule. In the present method the 3-keto A-ring saturated 6-dihydro steroid compound is simply contacted with the quinone in a solvent medium of the stipulated type within the specified elevated temperature range. This brings about direct dehydrogenation to produce highly desirable $\Delta^{4,6}$-steroid compounds. The process represents a significant advance in the art since in many of the naturally occurring sapogenins which are used in the preparation of valuable anti-inflammatory agents, the A-ring is completely saturated. Heretofore this has necessitated a series of reactions rather than the one reaction of the present process to produce valuable 3-keto A-ring unsaturated compounds.

As indicated above, in some methods of carrying out the process of the instant invention mixtures are obtained. These mixtures may be separated so as to obtain the desired purified product by various standard procedures such as crystallization from a solvent or a solvent mixture or by chromatographic purification on various adsorbents such as alumina, silica-gel or activated earth. For instance, the materials may be dissolved in a chlorinated lower aliphatic hydrocarbon such as methylene chloride and placed on a chromatographic column of activated Florida earth (Florosil). The column may then be developed by use of further amounts of the solvent or mixtures of such a solvent with a lower aliphatic alcohol or ketone. The various fractions leaving the column in the effluent may be checked to determine ultraviolet adsorption and various other physical characteristics useful in the identification and characterization of compounds of this type. A derivative such as the semicarbizone may be prepared for identification purposes from a sample of the crude product. Selected fractions are then concentrated to obtain the solid product. This material is often obtained in crystalline form and may be recrystallized from various oxygenated organic solvents such as alcohols, ketones or esters, for example, methanol, ethanol, isopropanol, ethyl acetate, etc.

The process of the instant invention is preferably carried out utilizing starting compounds free from primary alcohol groups, since there is some danger that these groups may be oxidized to yield undesirable side products. Primary alcohol groups are readily blocked by esterification with acids, acid anhydrides, or acid chlorides using procedures well known in the art. The primary alcohol function is readily regenerated if desired after application of the process of the instant invention by hydrolysis, for example, with methanolic hydrogen chloride.

The following examples are given solely for the purpose of illustration and are not to be construed as limitations of this invention, many apparent variations of which are possible without departing from the spirit or scope thereof.

This application is in part a continuation of the co-pending application Serial No. 633,538, filed January 11, 1957.

EXAMPLE I $\Delta^{1,4,6}$-pregnatriene-3,20-dione-17$\alpha$,21-diol 21-acetate A mixture of 400 mg. of allopregnane-3,20-dione-17$\alpha$,21-diol 21-acetate and 750 mg. of chloranil in 70 ml. of isobutyl alcohol was refluxed under an atmosphere of nitrogen for eighteen hours. The reaction mixture was then diluted with 150 ml. of chloroform. The solvent solution was washed with several small portions of 5% sodium hydroxide solution and then with water. It was dried over anhydrous sodium sulfate. The anhydrous salt was removed after several hours. The filtered solution was concentrated under vacuum and the product obtained as an amorphous solid. This was triturated with ether to obtain a crystalline product. The product was identical with a sample prepared by an unequivocal method.

EXAMPLE II $\Delta^{1,4,6}$-pregnatriene-3,20-dione-11$\beta$,17$\alpha$,21-triol 21 - acetate A mixture of 400 mg. of pregnane-3,20-dione-11$\beta$,17$\alpha$,21-triol 21-acetate and 1.5 g. of chloranil in 100 ml. of isobutyl alcohol was refluxed under an atmosphere of nitrogen for twenty-four hours. The reaction mixture was then diluted with 200 ml. of chloroform. The solvent solution was washed with several small portions of 5% sodium hydroxide solution and then with water. It was then dried over anhydrous sodium sulfate. The anhydrous salt was removed after several hours. The filtered solution was concentrated under vacuum and the product was obtained as an amorphous solid. This was triturated with ether to obtain a crystalline product. This product was shown to be identical with a sample prepared by an unequivocal method.

EXAMPLE III $\Delta^{1,4,6}$-pregnatriene-3,11,20-trione 21-ol 21-propionate

A mixture of 200 mg. of allopregnane-3,11,20-trione-21-ol 21-propionate and 1.0 g. of chloranil in 35 ml. of n-amyl alcohol was refluxed under an atmosphere of nitrogen for a period of twenty hours. The product was then isolated as described in the example directly above. It was shown to be identical with a sample prepared by an unequivocal method.

The process was repeated under exactly the same conditions using pregnane-3,11,20-trione-20-ol 21-propionate rather than the allopregnane compound and the same product was prepared.

EXAMPLE IV

$\Delta^{1,4,6}$-pregnatriene-3,20-dione-11$\beta$,21-diol 21-butyrate

A mixture of 800 mg. of allopregnane-3,20-dione-11$\beta$,21-diol 21-butyrate and 2 g. of chloranil in 100 ml. of secondary amyl alcohol was refluxed under an atmosphere of nitrogen for thirty hours. The reaction mixture was then diluted with 150 ml. of chloroform. The solvent solution was washed with several small portions of 5% sodium hydroxide solution and then with water. It was dried over anhydrous sodium sulfate, filtered and the filtrate concentrated in vacuo to yield the desired product.

EXAMPLE V

$\Delta^{1,4,6}$-androstatriene-3,11,17-trione

A mixture of 350 mg. of androstane-3,11,17-trione and 750 mg. of toluquinone in 75 ml. of isobutyl alcohol was refluxed for eight hours. The reaction mixture was then diluted with 150 ml. of chloroform. The solvent solution was washed with several small portions of 5% sodium hydroxide solution and then with water. It was dried over anhydrous sodium sulfate, filtered and the filtrate concentrated in vacuo to leave the desired product as a residue.

EXAMPLE VI

$\Delta^{1,4,6}$-androstatriene-3-one-17$\beta$-ol 17-benzoate

A mixture of 450 mg. of androstane-3-one-17$\beta$-ol 17-benzoate and 750 mg. of xyloquinone in 76 ml. of cyclohexanol was refluxed for ten hours under an atmosphere of nitrogen. The reaction mixture was then diluted with 150 ml. of benzene. The solvent solution was washed several times with 5% sodium hydroxide solution. It was then dried over anhydrous sodium sulfate, filtered and the filtrate concentrated in vacuo to yield the desired product as a residue.

EXAMPLE VII

$\Delta^{1,4,6}$-pregnatriene-3,20-dione

A mixture of 400 mg. of allopregnane-3,20-dione and 750 mg. of 1,2-naphthaquinone in 100 ml. of 1-hexanol was refluxed under an atmosphere of nitrogen for three hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE VIII

$\Delta^{1,4,6}$-pregnatriene-11$\beta$-ol-3,20-dione

A mixture of 800 mg. of pregnane-11$\beta$-ol-3,20-dione and 1.5 g. of benzoquinone in 100 ml. of 2-hexanol was refluxed under an atmosphere of nitrogen for thirty hours. The reaction mixture was then diluted with 150 ml. of chloroform. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE IX

$\Delta^{1,4,6}$-pregnatriene-3,20-dione-21-ol 21-acetate

A mixture of 400 mg. of pregnane-3,20-dione-21-ol 21-acetate and 750 mg. of chloranil in 75 ml. of 3-hexanol was refluxed for three hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE X

$\Delta^{1,4,6}$-pregnatriene-3,20-dione-9$\beta$,11$\beta$-oxido-17$\alpha$,21-diol 21-acetate A mixture of 400 mg. of allopregnane-3,20-dione-9$\beta$,11$\beta$-oxido-17$\alpha$,21-diol 21-acetate and 900 mg. of chloranil in 50 ml. of 3-hexanol was refluxed under a nitrogen atmosphere for eighteen hours. The reaction mixture was then diluted with 150 ml. of chloroform. The solvent solution was washed with several small portions of 5% sodium hydroxide solution and then with water. It was then dried over anhydrous sodium sulfate, filtered and the filtrate concentrated in vacuo to yield the desired product.

EXAMPLE XI

$\Delta^{1,4,6}$-pregnatriene-3,11,20-trione-14$\alpha$,17$\alpha$,21-triol 21-acetate A mixture of 400 mg. of pregnane-3,11,20-trione-14$\alpha$,17$\alpha$,21-triol 21-acetate and 800 mg. of toluquinone in 75 ml. n-pentyl alcohol was refluxed under an atmosphere of nitrogen for eighteen hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XII

$\Delta^{1,4,6}$-pregnatriene-3,20-dione-14$\alpha$,17$\alpha$,21-triol 21-acetate A mixture of allopregnane-3,20-dione-14$\alpha$,17$\alpha$,21-triol 21-acetate and 900 mg. of xyloquinone in 75 ml. of 1-octanol was maintained at 150° C. under an atmosphere of nitrogen for six hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XIII

$\Delta^{1,4,6}$-pregnatriene-3,20-dione-15$\beta$-bromo-14$\alpha$,17$\alpha$21-triol A mixture of 450 mg. of pregnane-3,20-dione-15$\beta$-bromo-14$\alpha$,17$\alpha$,21-triol and 900 mg. of chloranil in 100 ml. of 2-nonanol was maintained at a temperature of 135° C. for three hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XIV

$\Delta^{1,4,6,14}$-pregnatetraene-3,20-dione-11$\beta$,17$\alpha$,21-triol 21-acetate A mixture of 500 mg. of $\Delta^{14}$-pregnene-3,20-dione-11$\beta$,17$\alpha$,21-triol 21-acetate and 900 mg. of chloranil in 75 ml. of secondary amyl alcohol was refluxed under an atmosphere of nitrogen for eighteen hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XV

$\Delta^{1,4,6,16}$-pregnatetraene-3,20-dione-11$\beta$,21-diol 21-acetate

A mixture of 350 mg. of $\Delta^{16}$-allopregnene-3,20-dione-11$\beta$,21-diol 21-acetate and 800 mg. of chloranil in 75 ml. of secondary amyl alcohol was refluxed under a nitrogen atmosphere for sixteen hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XVI $\Delta^{1,4,6}$-pregnatriene-3,11,20-trione-14α,15α-oxido-17α 21-diol A mixture of 560 mg. of allopregnane-3,11,20-trione-14α,15α-oxido-11β,17α,21-triol 21-acetate and 1.2 g. of chloranil in 100 ml. of n-amyl alcohol was refluxed under an atmosphere of nitrogen for twenty-four hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XVII $\Delta^{4,6}$-pregnadiene-3,20-dione-17α,21-diol 21-acetate

A mixture of 400 mg. of allopregnane-3,20-dione-17α,21-diol 21-acetate and 500 mg. of chloranil in 75 ml. of secondary amyl alcohol was refluxed under an atmosphere of nitrogen for ten hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XVIII $\Delta^{4,6}$-pregnadiene-3,20-dione-11β,17α,21-triol 21-acetate A mixture of 200 mg. of pregnane-3,20-dione-11β,17α,21-triol 21-acetate and 250 mg. of chloranil in 60 ml. of n-amyl alcohol was refluxed under an atmosphere of nitrogen for thirty hours. The reaction mixture was washed with several small portions of 5% sodium hydroxide solution and then with water. It was dried over anhydrous magnesium sulfate, filtered and the filtrate concentrated in vacuo to yield the desired product as a residue.

EXAMPLE XIX $\Delta^{4,6}$-pregnadiene-3,11,20-trione-21-ol 21-propionate

A mixture of 100 mg. of pregnane-3,11,20-trione-21-ol 21-propionate and 125 mg. of chloranil in 50 ml. of cyclohexanol was refluxed under an atmosphere of nitrogen for eighteen hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XX $\Delta^{4,6}$-pregnadiene-3,20-dione-11β,21-diol 21-butyrate

A mixture of 400 mg. of pregnane-3,20-dione-11β,21-diol 21-butyrate and 450 mg. of chloranil in 65 ml. of isobutyl alcohol was refluxed under an atmosphere of nitrogen for eighteen hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXI $\Delta^{4,6}$-androstadiene-3,11,17-trione

A mixture of 350 mg. of androstane-3,11,17-trione and 425 mg. of chloranil in 65 ml. of 1-hexanol was maintained at 135° C. for twelve hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXII $\Delta^{4,6}$-androstadiene-3,one-11β-ol-17-benzoate

A mixture of 400 mg. of androstane-3,one-11β-ol 17-benzoate and 500 mg. of chloranil in 50 ml. of 3-hexanol was maintained at 140° under an atmosphere of nitrogen for six hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXIII $\Delta^{4,6}$-norandrostadiene-3,11,17-trione

A mixture of 400 mg. of norandrostane-3,11,17-trione and 244 mg. of toluquinone in 75 ml. of 3-hexanol was maintained at 130° C. under an atmosphere of nitrogen for sixteen hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXIV $\Delta^{4,6}$-norandrostadiene-3-one-17β-ol 17-benzoate

A mixture of 400 mg. of norandrostane-3-one-17β-ol 17-benzoate and 272 mg. of xyloquinone in 50 ml. of 1-octanol was maintained at a temperature of 135° C. for eight hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXV $\Delta^{4,6}$-pregnadiene-3,20-dione

A mixture of 200 mg. of allopregnane-3,20-dione and 136 mg. of xyloquinone in 50 ml. of 3-hexanol was refluxed under an atmosphere of nitrogen for twenty-four hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXVI $\Delta^{4,6}$-pregnatriene-11β-ol-3,20-dione

A mixture of 600 mg. of allopregnane-11β-ol-3,20-dione and 480 mg. of 1,2-naphthaquinone in 65 ml. of cyclohexanol was refluxed under an atmosphere of nitrogen for thirty hours. The reaction mixture was then diluted with 150 ml. of benzene. The solvent solution was washed with several small portions of 5% sodium hydroxide solution and then with water. It was dried over anhydrous magnesium sulfate, filtered and the fil-

EXAMPLE XXVII $\Delta^{4,6}$-pregnadiene-3,20-dione-21-ol 21-acetate

A mixture of 400 mg. of pregnane-3,20-dione-21-ol 21-acetate and 205 mg. of benzoquinone in 75 ml. of n-amyl alcohol was refluxed under an atmosphere of nitrogen for twelve hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXVIII $\Delta^{4,6}$-pregnadiene-3,20-dione-9$\beta$,11$\beta$-oxido-17$\alpha$,21-diol 21-acetate A mixture of 400 mg. of pregnane-3,20-dione-9$\beta$,11$\beta$-oxido-17$\alpha$,21-diol 21-acetate and 500 mg. of chloranil in 75 ml. of secondary amyl alcohol was refluxed under an atmosphere of nitrogen for twenty hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXIX $\Delta^{4,6}$-pregnadiene-3,11,20-trione-14$\alpha$,17$\alpha$,21-triol 21-acetate A mixture of 600 mg. of allopregnane-3,11,20-trione-14$\alpha$,17$\alpha$,21-triol 21-acetate and 750 mg. of chloranil in 100 ml. of n-pentol was refluxed under an atmosphere of nitrogen for eight hours. The reaction mixture was then diluted with 150 ml. of benzene. The solvent solution was washed with several small portions of 5% sodium hydroxide and then with water. It was dried over anhydrous magnesium sulfate, filtered and the filtrate concentrated in vacuo to yield the desired product as a residue.

EXAMPLE XXX $\Delta^{4,6}$-pregnadiene-3,20-dione-14$\alpha$,17$\alpha$,21-triol 21-acetate A mixture of 225 mg. of pregnane-3,20-dione-14$\alpha$,17$\alpha$,21-triol 21-acetate and 450 mg. of chloranil in 75 ml. of cyclohexanol was maintained at a temperature of 120° C. under an atmosphere of nitrogen for four hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXXI $\Delta^{4,6}$-pregnadiene-3,20-dione-15$\beta$-bromo-14$\alpha$,17$\alpha$ 21-triol A mixture of 500 mg. of pregnane-3,20-dione-15$\beta$-bromo-14$\alpha$,17$\alpha$,21-triol and 600 mg. of chloranil in 100 ml. of isobutyl alcohol was refluxed under an atmosphere of nitrogen for five hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXXII $\Delta^{4,6,14}$-pregnatriene-3,20-dione-11$\beta$,17$\alpha$,21-triol 21-acetate A mixture of 400 mg. of $\Delta^{14}$-pregnene-3,20-diene-11$\beta$,17a,21-triol 21-acetate and 244 mg. of toluquinone in 75 ml. of 1-octanol was maintained at a temperature of 150° C. for three hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXXIII $\Delta^{4,6,16}$-pregnatriene-3,20-dione-11$\beta$,21-diol 21-acetate A mixture of 450 mg. of $\Delta^{16}$-pregnene-3,20-dione-11$\beta$,21-diol 21-acetate and 500 mg. of chloranil in 75 ml. of secondary amyl alcohol was refluxed under an atmosphere of nitrogen for four hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXXIV $\Delta^{1,4,6}$-pregnatriene-3,11,20-trione-14$\alpha$,15$\alpha$-oxido-17$\alpha$ 21-diol 21-acetate A mixture of 500 mg. of allopregnane-3,11,20-trione-14$\alpha$,15$\alpha$-oxido-17$\alpha$,21-diol and 500 mg. of chloranil in 75 ml. of isobutyl alcohol was refluxed under an atmosphere of nitrogen for five hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXXV $\Delta^{4,6}$-pregnadiene-9$\alpha$-fluoro-3,20-dione-11$\beta$,17$\alpha$,21-triol 21-acetate A mixture of 800 mg. of allopregnane-9$\alpha$-fluoro-3,20-diol-11$\beta$,17$\alpha$,21-triol 21-acetate and 950 mg. of chloranil in 75 ml. of secondary amyl alcohol was refluxed under an atmosphere of nitrogen for four hours. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXXVI $\Delta^{4,6}$-pregnadiene-9$\alpha$-fluoro-3,11,20-trione-17$\alpha$,21-diol 21-acetate A mixture of 420 mg. of pregnane-9$\alpha$-fluoro-3,11,20-trione-17$\alpha$,21-diol 21-acetate and 500 mg. of chloranil in 75 ml. of cyclohexanol was refluxed for four hours under an atmosphere of nitrogen. The reaction mixture was then diluted with 150 ml. of benzene. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXXVII $\Delta^{1,4,6}$-pregnatriene-3,20-dione-17$\alpha$,21-diol 21-acetate A mixture of 400 mg. of allopregnane-3,20-dione-17$\alpha$,21-diol 21-acetate and 800 mg. of 2,6-dichlorobenzoquinone in 100 ml. of 2-nonanol was maintained at a temperature of 185° C. for six hours. The excess quinone was reduced by the addition of 20 ml. of 5% sodium hydro-sulfite. The reaction mixture was then diluted with 150 ml. of chloroform. The solvent solution was washed with several small portions of 5% sodium hydroxide solution and then with water. It was dried over anhydrous magnesium sulfate, filtered and the filtrate con-

EXAMPLE XXXVIII $\Delta^{1,4,6}$-androstatriene-3-one-17β-ol 17-acetate

A mixture of 450 mg. of etiocholane-3-one-17β-ol 17-acetate and 750 mg. of chloranil in 75 ml. of n-heptyl alcohol was maintained at a temperature of 130° C. for ten hours under an atmosphere of nitrogen. The reaction mixture was then diluted with 150 ml. of chloroform. The solvent solution was washed with several small portions of 5% sodium hydroxide solution and then with water. It was dried over anhydrous magnesium sulfate, filtered and the filtrate concentrated in vacuo to yield the desired product as a residue.

EXAMPLE XXXIX $\Delta^{1,4,6,9(11)}$-pregnatetraene-3,20-dione-17α,21-diol 21-acetate A mixture of 300 mg. of $\Delta^{9(11)}$-allopregnene-3,20-dione-17α,21-diol 21-acetate and 800 mg. of chloranil in 85 ml. of isobutyl alcohol was refluxed under an atmosphere of nitrogen for eighteen hours. The reaction mixture was then diluted with 150 ml. of chloroform. The solvent solution was washed with several small portions of 5% sodium hydroxide solution and then with water. It was dried over anhydrous magnesium sulfate, filtered and the filtrate concentrated in vacuo to yield the deisred product as a residue.

What is claimed is:

1. A process for the produciton of a 3-keto-$\Delta^{4,6}$-steroid compound having from eighteen to twenty-one carbon atoms in the steroid nucleus which comprises reacting the corresponding 3-keto A-ring saturated 6-dihydro steroid compound with at least two molar proportions of a quinone having an oxidation-reduction potential less than —0.5, at an elevated temperature between about 100° C. and about 190° C. in an alkanol solvent having up to nine carbon atoms and a boiling point of at least about 100° C.

2. A process for the production of a 3-keto-$\Delta^{1,4,6}$-steroid compound having from eighteen to twenty-one carbon atoms in the steroid nucleus which comprises reacting the corresponding 3-keto A-ring saturated 6-dihydro steroid compound with from about three to about six molar proportions of a quinone having an oxidation-reduction potential less than —0.5 at an elevated temperature between about 100° C. and about 190° C. in an alkanol solvent having up to nine carbon atoms and a boiling point of at least about 100° C., said steroid compound being free from halogen substitution at the 9α-position.

3. A process for the production of a 3-keto-$\Delta^{4,6}$-steroid compound having from eighteen to twenty-one carbon atoms in the steroid nucleus which comprises reacting the corresponding 3-keto A-ring saturated 6-dihydro steroid compound with less than three moles of a quinone having an oxidation-reduction potential less than —0.5, at an elevated temperature between about 100° C. and about 190° C. in an alkanol solvent having up to nine carbon atoms and a boiling point of at least about 100° C.

4. The process of claim 1 wherein the quinone is chloranil.

5. The process of claim 1 wherein the quinone is 2,6-dichlorobenzoquinone.

6. The process of claim 1 wherein the quinone is benzoquinone.

References Cited in the file of this patent

UNITED STATES PATENTS 2,739,974    Colton _____ Mar. 27, 1956

OTHER REFERENCES

Fieser: Organic Chemistry, 1950, pages 752–757.
Chemical and Engineering News, Sept. 16, 1957, pages 66 and 67.